US010810577B2

(12) United States Patent
Kieffer et al.

(10) Patent No.: US 10,810,577 B2
(45) Date of Patent: Oct. 20, 2020

(54) CHECK-IN TO CHECKOUT SYSTEMS AND METHODS

(71) Applicant: Walmart Apollo, LLC, Bentonville, AR (US)

(72) Inventors: Bradley Joseph Kieffer, Rogers, AR (US); Mark Matthews, Rogers, AR (US); Eytan Daniyalzade, San Francisco, CA (US); Charles David Berry, Fayetteville, AR (US); Prasanna Rajendran, Bentonville, AR (US); David Martin Nelms, Rogers, AR (US); Daniel Eckert, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/308,473

(22) PCT Filed: Oct. 12, 2015

(86) PCT No.: PCT/US2015/055130
§ 371 (c)(1),
(2) Date: Nov. 2, 2016

(87) PCT Pub. No.: WO2017/065733
PCT Pub. Date: Apr. 20, 2017

(65) Prior Publication Data
US 2017/0243190 A1    Aug. 24, 2017

(51) Int. Cl.
*G06Q 20/32* (2012.01)
*G06Q 20/20* (2012.01)

(52) U.S. Cl.
CPC ....... *G06Q 20/3276* (2013.01); *G06Q 20/208* (2013.01); *G06Q 20/32* (2013.01)

(58) Field of Classification Search
CPC .............. G06Q 30/06; G06Q 20/2018; G06Q 20/3274; G06Q 40/00; G06Q 20/322;
(Continued)

(56) References Cited

U.S. PATENT DOCUMENTS 6,993,507 B2    1/2006  Meyer et al.
8,498,900 B1 *  7/2013  Spirin ................... G06Q 50/00
                                                   340/286.09
(Continued)

OTHER PUBLICATIONS

"Apple Pay," Apple.com, accessed on Jul. 21, 2015; 12 pages.
International Search Report & Written Opinion in international patent application No. PCT/US15/55130, dated Dec. 28, 2015.

*Primary Examiner* — Florian M Zeender
*Assistant Examiner* — Vanessa Deligi
(74) *Attorney, Agent, or Firm* — Schmeiser, Olsen & Watts LLP; Sean K. Enos (57) ABSTRACT

Provided are check-in to checkout systems and methods. The system includes a point of sale, a display, a mobile device, and a backend system. When the POS starts a transaction, such as, but not limited to scanning an item, the POS generates a transaction/basket identification. In response to starting the transaction, the POS sends the transaction/basket ID to the display in the form of a QR code or one-dimensional barcode. The mobile device operating a mobile application scans and captures the displayed code and reports to the backend systems. The backend systems then send a check-in event, which includes gathered data by the backend systems, to the POS and the POS acknowledges receipt of the message. At this point, a notification may be sent to the mobile application that the check-in was successful and a link is established for flow of information.

16 Claims, 10 Drawing Sheets

(58) Field of Classification Search
CPC ........ G06Q 20/10; G06Q 20/38; G06Q 30/00;
G06Q 50/00; G06Q 20/32; G06Q 20/36;
G07B 17/00; G07F 19/00; G08B 5/36
USPC .. 705/23, 27.1, 44, 39, 15, 30, 14.4, 64, 40,
705/4; 340/286.09
See application file for complete search history.

(56) References Cited

U.S. PATENT DOCUMENTS

| | | | |
|---|---|---|---|
| 9,342,828 B2* | 5/2016 | Sanchez | G06Q 20/40 |
| 9,589,266 B2* | 3/2017 | Pourfallah | G06Q 20/3276 |
| 2005/0127167 A1* | 6/2005 | Nakajima | G06Q 20/4012 |
| | | | 235/380 |
| 2009/0204530 A1 | 8/2009 | Hanson | |
| 2010/0138344 A1 | 6/2010 | Wong et al. | |
| 2011/0251892 A1* | 10/2011 | Laracey | G06Q 30/0253 |
| | | | 705/14.51 |
| 2012/0205445 A1 | 8/2012 | Rothschild | |
| 2012/0209749 A1* | 8/2012 | Hammad | G06Q 20/20 |
| | | | 705/27.1 |
| 2012/0284130 A1 | 11/2012 | Lewis et al. | |
| 2013/0013490 A1 | 1/2013 | Keller et al. | |
| 2013/0198076 A1* | 8/2013 | Zambelli Hosmer | G06Q 20/12 |
| | | | 705/44 |
| 2013/0246259 A1* | 9/2013 | Dessert | G06Q 20/405 |
| | | | 705/41 |
| 2014/0006184 A1 | 1/2014 | Godsey | |
| 2014/0101036 A1* | 4/2014 | Phillips | G06Q 20/027 |
| | | | 705/39 |
| 2014/0180777 A1* | 6/2014 | Moshrefi | G06Q 20/20 |
| | | | 705/14.4 |
| 2014/0291391 A1 | 10/2014 | Kumar et al. | |
| 2014/0310174 A1 | 10/2014 | Heeter | |
| 2014/0379532 A1* | 12/2014 | Agasti | G06Q 30/0641 |
| | | | 705/27.1 |
| 2015/0088674 A1 | 3/2015 | Flurscheim et al. | |
| 2015/0170164 A1* | 6/2015 | Marsico | G06Q 30/0201 |
| | | | 235/375 |
| 2015/0262174 A1* | 9/2015 | Mongillo, III | G06Q 50/12 |
| | | | 705/15 |
| 2016/0203352 A1* | 7/2016 | Marsico | G06Q 50/24 |
| | | | 235/375 |
| 2016/0292677 A1* | 10/2016 | Karlsson | G06Q 20/20 |

* cited by examiner

CHECK-IN TO CHECKOUT SYSTEMS AND METHODS

FIELD OF THE INVENTION

The invention relates generally to checking out, and more specifically, to systems and methods for checking in at a point of sale system in a checkout area of a store.

BACKGROUND

Merchant point of sale systems can be an inconvenience to the customer. The customers have to wait for all the items to be scanned and totaled before facilitating their payment through the merchant's point of sale systems. The customers must also thumb through their wallet to determine what form of payment they would like to use for the purchase and swipe/dip the payment instrument for payment. At the end of the transaction, the customer receives a paper receipt they may need to store or track for refunds, etc.

BRIEF SUMMARY

In one aspect, provided is a method for checking in at a point of sale. The method comprises: starting a transaction at the point of sale; generating a code in response to starting a transaction at the point of sale, wherein the code includes a transaction identification; scanning the code at the point of sale; and associating the transaction identification with a customer payment profile in response to scanning of the code, wherein payment is effected at the end of the transaction at the point of sale.

In another aspect, provided is a method for checking in at a point of sale. The method comprises: generating a code for requesting a transaction identification; scanning the code at a point of sale; associating the transaction identification with a customer payment profile in response to scanning of the code; and starting a transaction at a point of sale, wherein payment is effected at the end of the transaction at the point of sale.

In another aspect, provided is a method for checking in at a point of sale. The method comprises: starting a transaction at the point of sale; generating a transaction identification at the point of sale and providing it to a wireless device of the point of sale; transmitting data including the transaction identification from the wireless device to a customer mobile device; automatically sending a check-in event from the backend systems to the point of sale in response to receiving the transaction identification from the wireless device; and associating the transaction identification with a customer payment profile by the backend system, wherein payment is effected at the end of the transaction at the point of sale.

In another aspect, provided is a check-in system at a point of sale, the system comprising: a point of sale, wherein a transaction identification is generated at the point of sale; and backend systems, wherein: the transaction identification is received by the backend systems from one of the point of sale or a customer mobile device; the backend systems gather information for associating the transaction identification with a customer payment profile in response to receiving transaction identification; and wherein the point of sale communicates with the backend systems to effect payment at the end of the transaction at the point of sale.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Many store customers have times when they shop online and other times when they are physically present at a brick-and-mortar store. In order to shop online, a customer must establish an e-commerce account with the particular business which often includes entering and storing payment instruments in a database for use with the that particular business. This provides ease of checking out at the end of an online shopping session, wherein the customer can simply execute a few mouse clicks or other input, such as use of a touchscreen and the like, to execute payment to complete an online transaction. Sometimes the payment instruments are stored for future re-use as part of checking out and completing an order.

Shopping in a brick-and-mortar store requires the customer must move around and peruse items and goods with the store, select the goods, often putting them within a cart and then proceeding to a checkout line, where a point of sale terminal is then used to scan or otherwise total the amount of money due to purchase the items. The customer must then retrieve the payment instrument from his or her wallet or purse and provide the payment instrument to the point of sale terminal. If a payment card is the type of payment instrument, the card is either swiped by the customer or the employee at the checkout and the payment is processed either by entering a personal identification number ("PIN") or signing to authorize the payment, thus completing the transaction.

Online customers enjoy an expedient check out that is typically not offered at a brick-and-mortar store. The present inventive concepts provide a system and methods for expeditiously processing payment and checking out with a check-in process that occurs at the beginning of the transaction taking place at the point of sale. For example, the customer can check-in at the beginning of the process, allowing payment to occur when all items are scanned without having to use a physical payment instrument.

Figure 1:
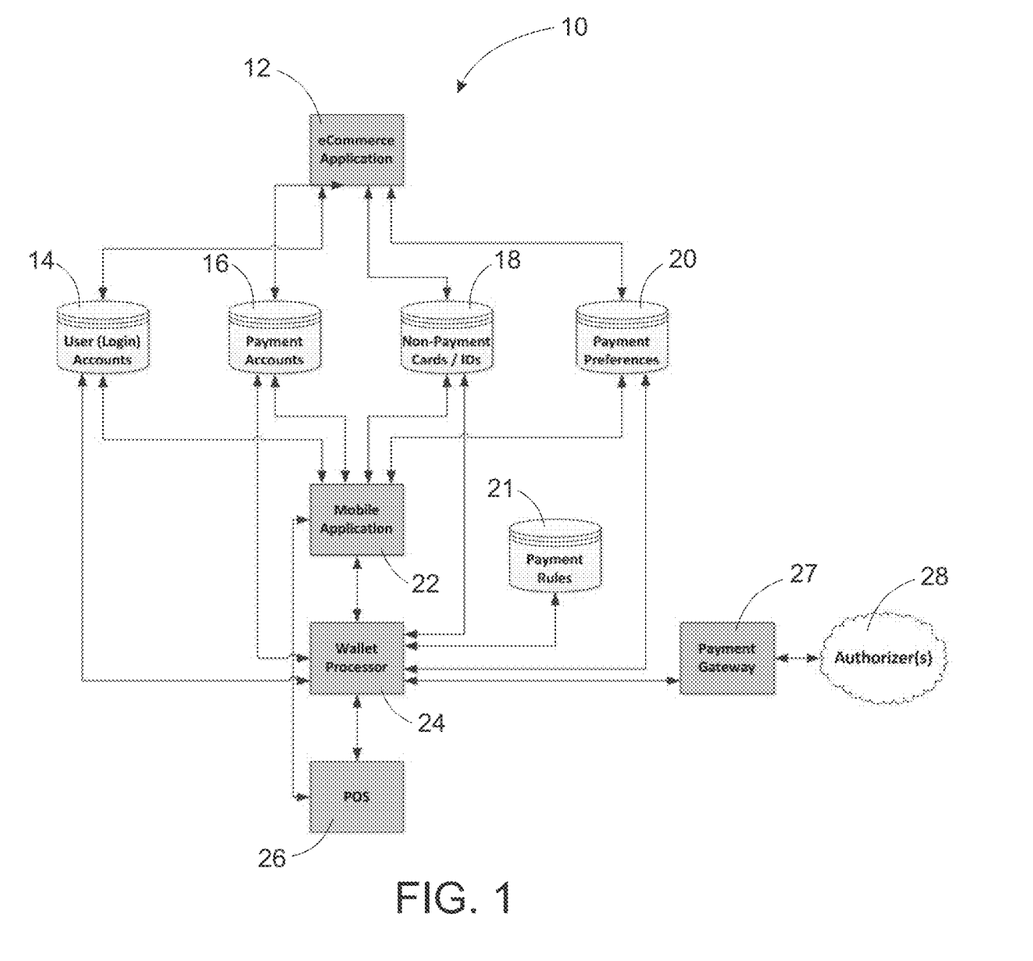
FIG. 1 is a block diagram of a system for re-using e-commerce payment instruments for in-store purchasing, in accordance with embodiments.

FIG. 1 is a block diagram of a system 10 for re-using e-commerce payment instruments for in-store purchasing. The system 10 may include a backend system having various databases, such as, but not limited to user accounts 14, payment accounts 16, non-payment cards/identifiers 18, payment preferences 20, and payment rules 21. These databases 14, 16, 18 and 20 are accessible from an e-commerce application 12. Further, the databases 14, 16, 18 and 20 are accessible from a mobile application 22. The system 10 may also include a wallet processor 24, a point of sale ("POS") 26, a payment gateway 27 and an authorizer(s) 28. The wallet processor 24 may have access to payments accounts 16, non-payment cards/identifiers 18, payment preferences 20, and payment rules 21 databases. The e-commerce application 12 may be accessible through a computing device, such as but not limited to a computer, a laptop, a tablet, a smartphone and the like. The e-commerce application 12 may be an e-commerce website accessible through an Internet connection. The mobile application 22 may be accessible through a mobile device, such as a smartphone, a tablet and the like. The mobile application 22 may be a downloadable application that is installed and operated on the mobile device. The payment gateway 27 may operate to send messages routed to the authorizers 28.

Figure 2:
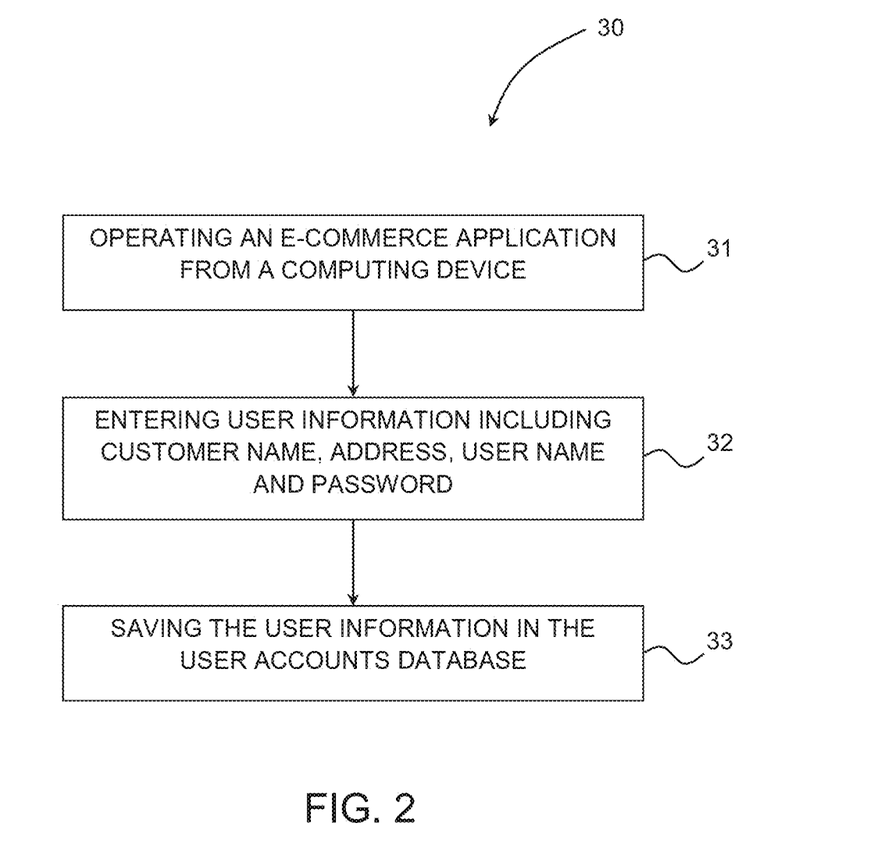
FIG. 2 is a flow diagram illustrating a method for creating an e-commerce account, in accordance with some embodiments.

Referring additionally to FIG. 2, the system 10 may be utilized to execute a method 30 of creating an e-commerce account. The method 30 may include operating an e-commerce application 12 from a computing device (Step 31); entering user information including customer name, address, user name and password (Step 32); and saving the user information in the user accounts 14 database (Step 33). The method 30 may further include entering a payment instrument information through the e-commerce application 45 and storing the payment instrument information in the payment accounts 16 database. The method 30 may also include entering non-payment card/identifier information through the e-commerce application 12 and storing the non-payment card/identifier information in the non-payment cards/identifier 18 database. It will be understood that the method 30, in some embodiments, is a precondition to using the system to complete a transaction at a POS 26.

Further, access to the user accounts 14, payment accounts 16, non-payment cards/identifiers 18 and payment preferences 20 databases are secured by restricting access to the information. The username and password stored in the user accounts 14 database includes the information that must be input through a user graphical interface in order for a customer to login to his or her e-commerce account to access, update, change and the like the information stored in the user accounts 14, payment accounts 16, non-payment cards/identifiers 18, and payment preferences 20 databases. The customer may login to the e-commerce account through the e-commerce application 12 or through the mobile application 22.

It is anticipated that the user account 14 may be changed and updated at any time through use of the e-commerce application 12 or the mobile application 22. For example, address information may be updated, additional payment instruments may be added to the payment accounts 16, and additional non-payment cards may be added to the non-payment cards/identifier 18. Further, as payment instruments expire, the payment instrument information stored in the payment accounts 16 may be updated or removed.

Figure 3:
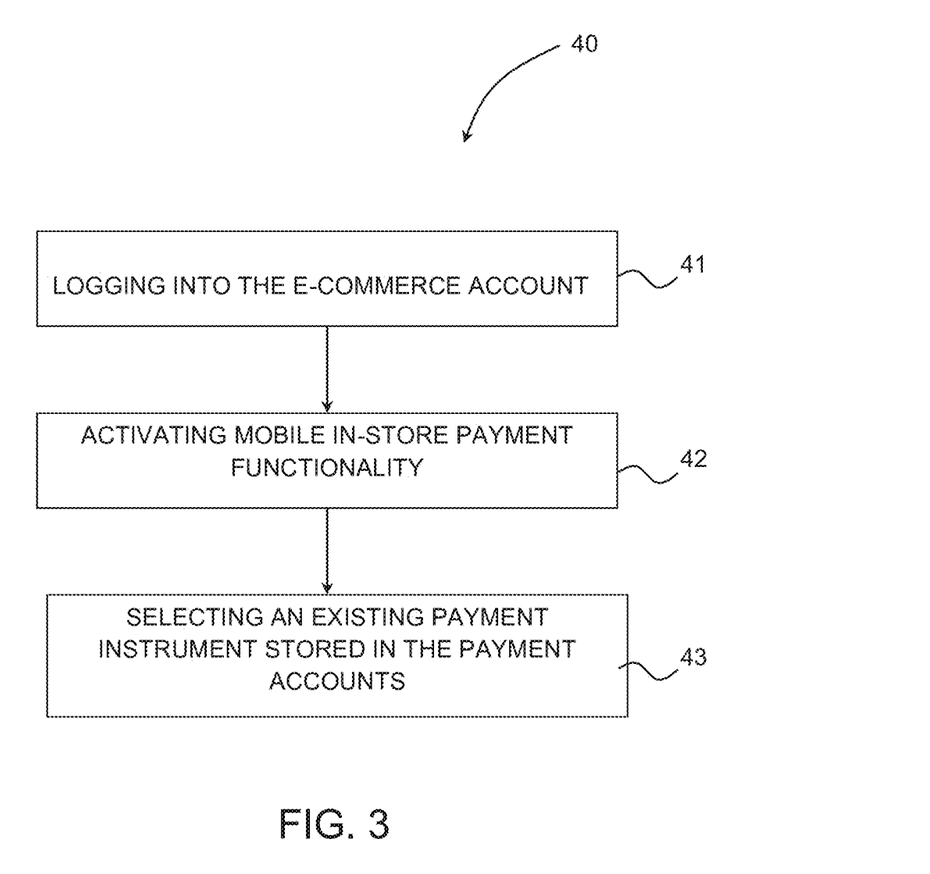
FIG. 3 is a flow diagram illustrating a method for setting up e-commerce payments instruments for use in-store, in accordance with some embodiments.

FIG. 3 depicts a method 40 of setting up e-commerce payments instruments for in-store use. For example, the method 40 may include logging into the e-commerce account (Step 41) through the mobile application 22 or through the e-commerce application 12; activating mobile in-store payment functionality (Step 42), wherein activating the mobile in-store payment functionality requires creating a new payment authentication code, such as a PIN, password and the like; and selecting an existing payment instrument stored in the payment accounts 16 for use in mobile in-store payment (Step 43). This information may be stored in the payment preferences 20.

Step 43 of selecting an existing payment instrument may be repeated to select multiple payment instruments for use with mobile in-store payments. If multiple payment instruments are selected, the customer may also indicate how he or she prefers to use the payment instruments when conducting transactions in the store.

The method 40 may also include entering a new payment instrument through the mobile application 22 and indicating if it may also be used for e-commerce transactions and/or how the customer prefers to use the payment instrument when transacting in the store.

The method 40 may also include presenting a list of existing non-Payment cards/identifiers (e.g. Membership, Loyalty, Discount, Offers) to a customer and selecting which non-payment cards/identifiers to load for mobile in-store processing. This may be repeated if there are multiple non-payment cards on file. The method may also include entering new non-Payment cards/identifiers to the non-payment cards/identifiers 18 database and selecting it to be used for e-commerce transactions or when transacting in the store.

Figure 4:
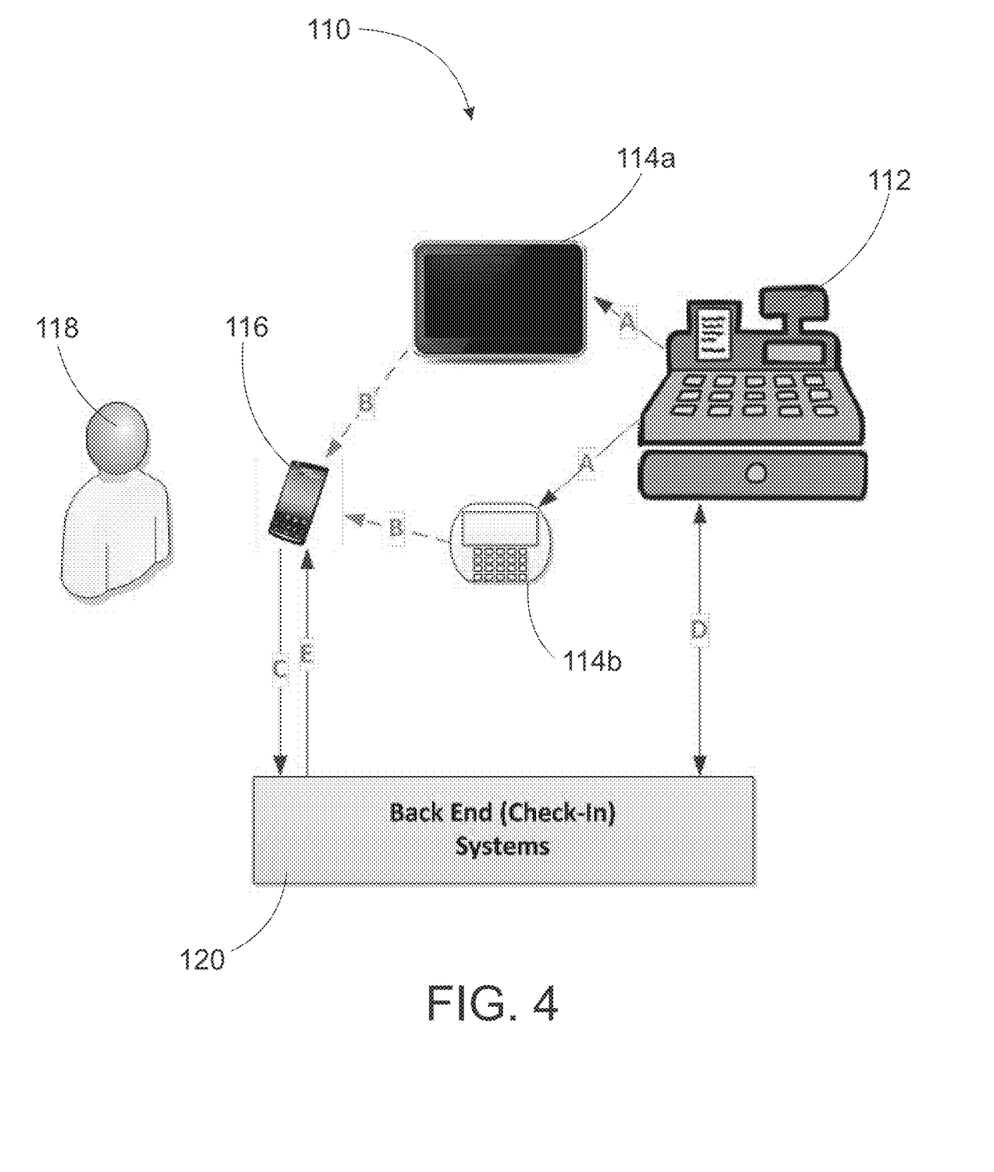
FIG. 4 is an illustrative view of a check-in system, in accordance with some embodiments.

FIG. 4 depicts a check-in system 110. The system 110 includes a point of sale ("POS") 112, a display 114a and/or a card processing device 114b, a mobile device 116, and a backend system 120. When the POS 112 starts a transaction, such as, but not limited to scanning an item, the POS 112 generates a transaction/basket identification. In response to starting the transaction, the POS 112 sends the transaction/basket ID to one of a customer facing display 114a, a card processing device 114b or both. The transaction/basket ID may be in the form of a QR code or ID barcode. A customer uses his or her mobile device 116 operating a mobile application 22 to scan and capture the displayed QR code/ID barcode. The mobile application 22 reports to the backend systems 120 that the mobile application 22 has captured the transaction/basket ID.

The backend systems 120 operate to gather additional information, determine the specific POS 112 device from the data in transaction/basket ID. The backend systems 120 then sends a check-in event, which includes the gathered data, to the POS 112. The POS 112 acknowledges receipt of the message. At this point, a notification may be sent to the mobile application 22 that the check-in was successful. Once the check-in is successful, a link is established by the check in for information to flow from the backend systems 120, the mobile device 116 and the POS 112, such as, without limitation, payment data, authorizations, customer IDs, basket data, electronic receipts, etc.

Figure 5:
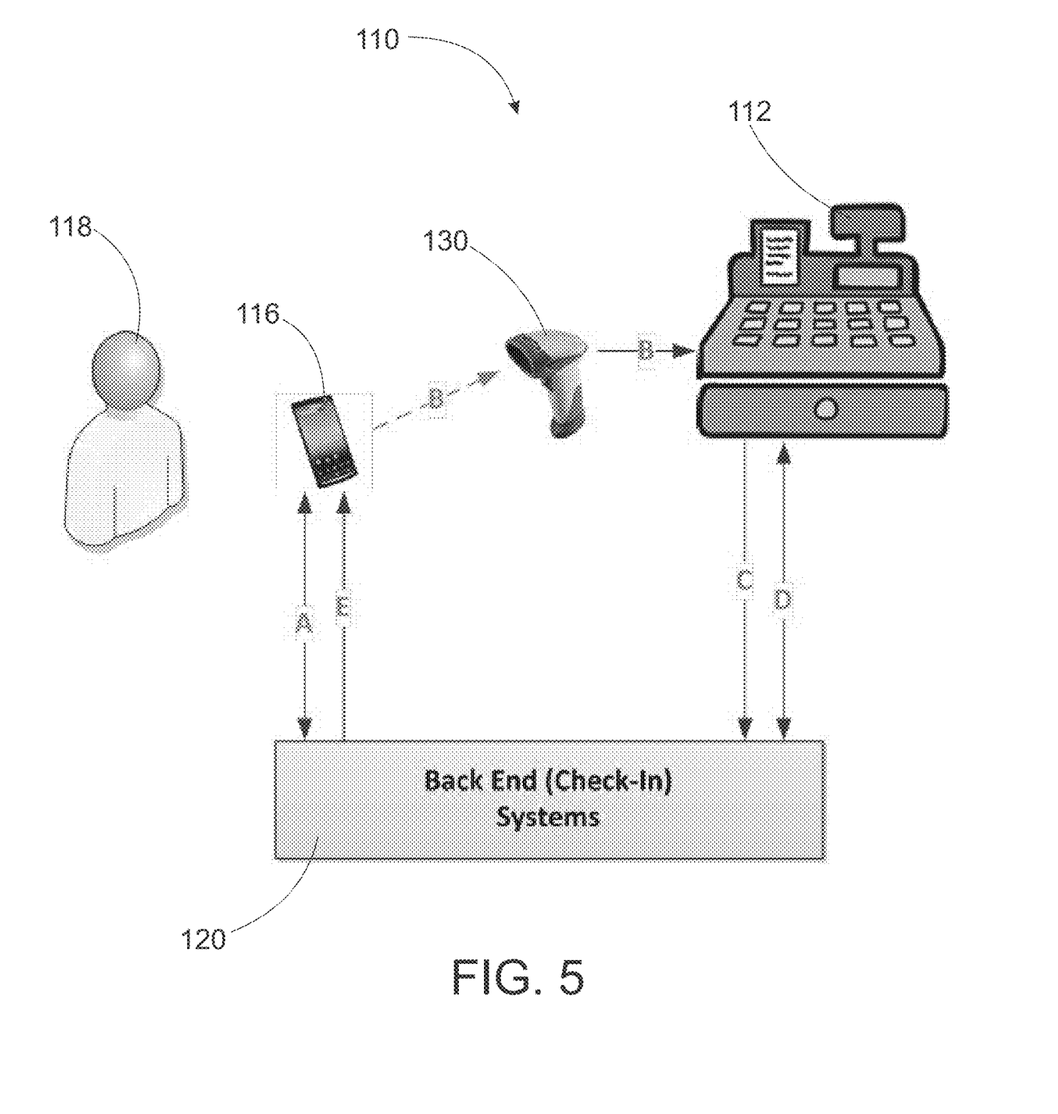
FIG. 5 is an illustrative view of another check-in system, accordance with some embodiments.

FIG. 5 depicts another check-in system 110. The system 110 includes a POS 112, a scan device 130 of a POS 112, a mobile device 116, and a backend system 120. The mobile device 116 operates a mobile application 22 and requests a transaction/basket ID. The mobile application 22 may then display the transaction/basket ID in the form of a QR code or ID barcode. The scan device 130 of the POS 112 scans the code displayed on the customer's mobile device 116. The POS 112 reports to backend systems 120 that the POS 112 has scanned and captured the transaction/basket ID.

The backend systems 120 operate to gather additional information, determine the specific POS 112 device from the data in transaction/basket ID. The backend systems 120 then send a check-in event, which includes the gathered data, to the POS 112. The POS 112 acknowledges receipt of the message. At this point, a notification may be sent to the mobile application 22 that the check-in was successful. Once the check-in is successful, a link is established by the check in for information to flow from the backend systems 120, the mobile device 116 and the POS 112, such as, without limitation, payment data, authorizations, customer IDs, basket data, electronic receipts, etc.

Figure 6:
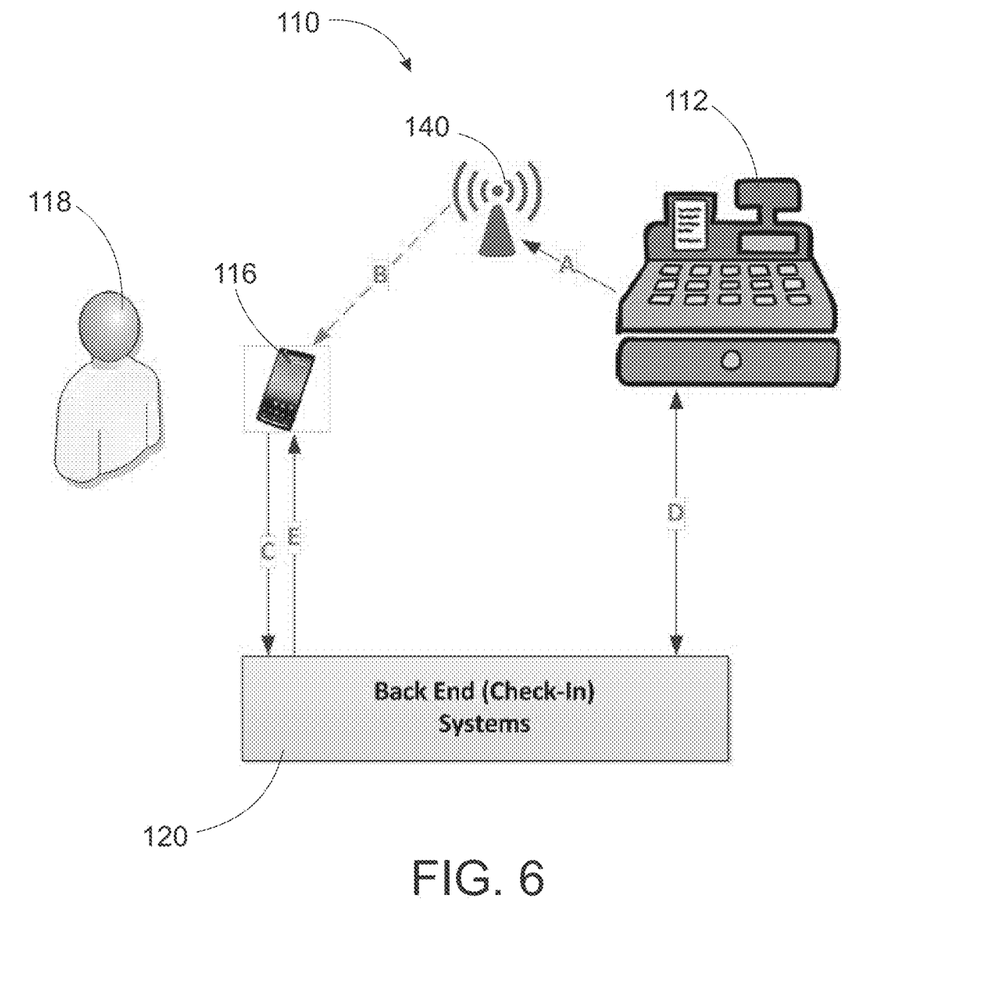
FIG. 6 is an illustrative view of yet another check-in system, in accordance with some embodiments.

FIG. 6 depicts yet another check-in system 110. The system 110 includes a point of sale ("POS") 112, a wireless device 140, a mobile device 116, and a backend systems 120. When the POS 112 starts a transaction, such as, but not limited to scanning an item, the POS 112 generates a transaction/basket identification. In response to starting the transaction, the POS 112 sends the transaction/basket ID to the wireless device 140. The wireless device 140 transmits a message containing the transaction/basket ID. The transmission may be a Bluetooth transmission, a Bluetooth low energy transmission, a near field communication transmission, or the like. A customer places his or her mobile device 116 within a range or proximity to the wireless device in order to detect the transmission of the message. When the mobile device 116 is within range and detects the transmission of the message, the customer is provided with an option to launch a check-in feature. If the customer agrees to the launch the check-in feature, the mobile application 22 is launched into a check-in mode, wherein the customer may be prompted to enter additional authentication credential. The mobile application 22 reports to the backend systems 120 that the mobile application 22 has captured the transaction/basket ID.

The backend systems 120 operate to gather additional information, determine the specific POS 112 device from the data in transaction/basket ID. The backend systems 120 then send a check-in event, which includes the gathered data, to the POS 112. The POS 112 acknowledges receipt of the message. At this point, a notification may be sent to the mobile application 22 that the check-in was successful. Once the check-in is successful, a link is established by the check in for information to flow from the backend systems 120, the mobile device 116 and the POS 112, such as, without limitation, payment data, authorizations, customer IDs, basket data, electronic receipts, etc.

Figure 7:
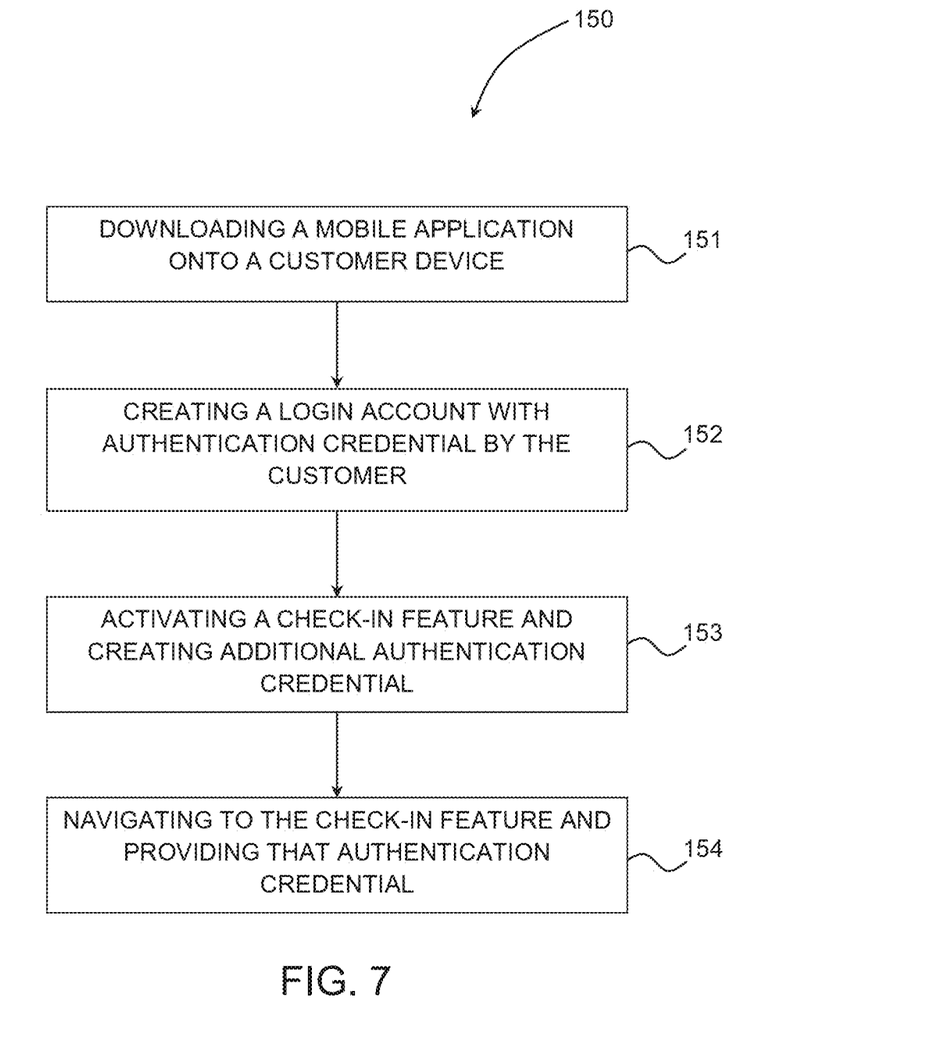
FIG. 7 is a flow diagram illustrating a method of pre-requisite steps to use a check-in system, in accordance with embodiments.

In order tier the system to operate, some pre-requisite steps must first be accomplished as shown in FIG. 7 depicting a method 150 of pre-requisite steps for using a check-in system. The method 150 may include downloading a mobile application onto a customer device (Step 151); creating a login account with authentication credential by the customer, wherein the customer has previously logged into the mobile application (Step 152); activating a check-in feature and creating additional authentication credential (Step 153); and navigating to the check-in feature and providing that authentication credential (Step 154). In some embodiments, the method 150 may include enabling wireless communications, such as Bluetooth, etc.

Figure 8:
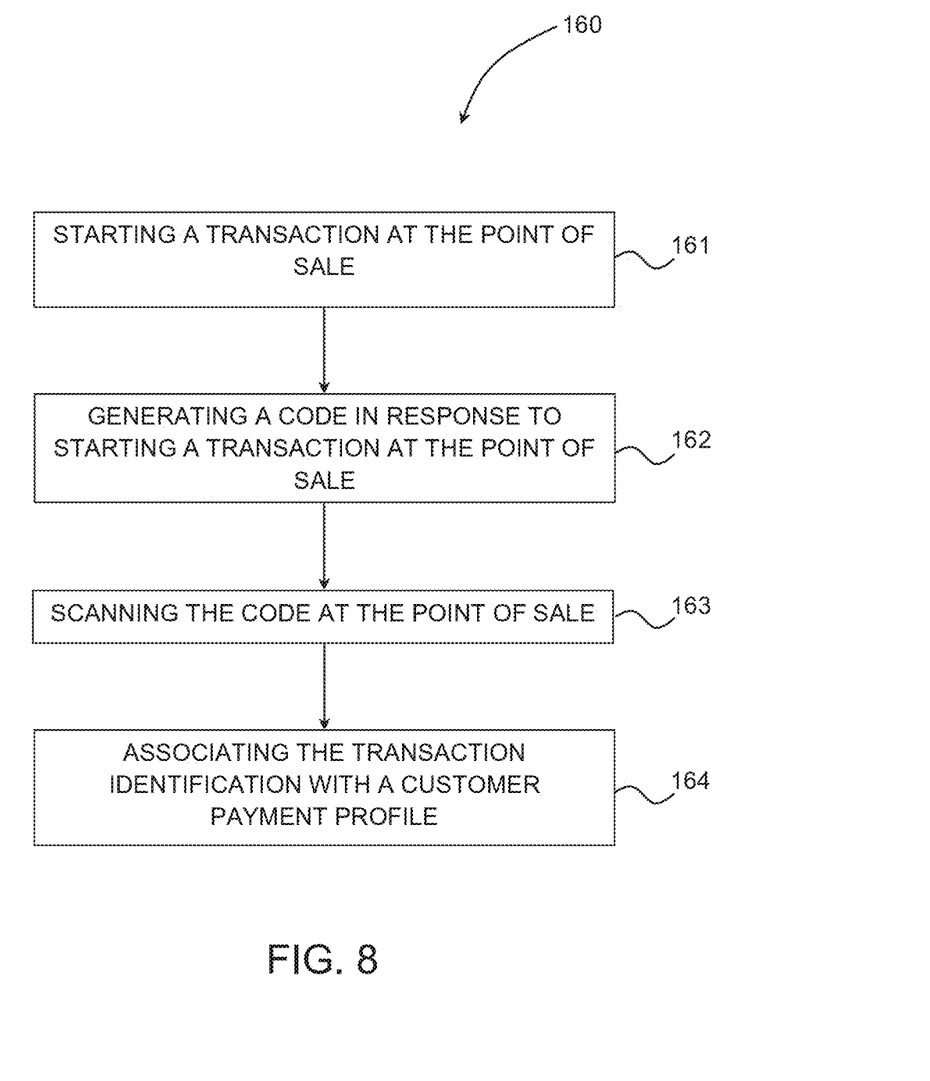
FIG. 8 is a flow diagram illustrating a method for checking in at a checkout point of sale, in accordance with embodiments.

FIG. 8 depicts a method 160 for checking in at a point of sale in accordance with embodiments. The method 160 includes starting a transaction at the point of sale (Step 161); generating a code in response to starting a transaction at the point of sale, wherein the code includes a transaction identification (Step 162); scanning the code at the point of sale (Step 163); and associating the transaction identification with a customer payment profile in response to scanning of the code, wherein payment is effected at the end of the transaction at the point of sale (Step 164).

Step 161 of generating the code may comprise generating a QR code or generating a one-dimensional code. Step 163 of scanning the code may include scanning the code with a customer mobile device operating a mobile application. Scanning of the code with the customer mobile device operating the mobile application transfers the transaction identification and the customer payment profile to a backend system for associating the transaction identification with the customer payment profile. The code may further include a store identification and a register identification, as well as additional data to prevent the contents from being predictable.

The method 160 may further include sending a check-in event the backend systems to the point of sale for associating the transaction identification with the customer payment profile, wherein the check-in event automatically triggers operation of software instruction on the backend system to associate the transaction identification with the customer payment profile.

Figure 9:
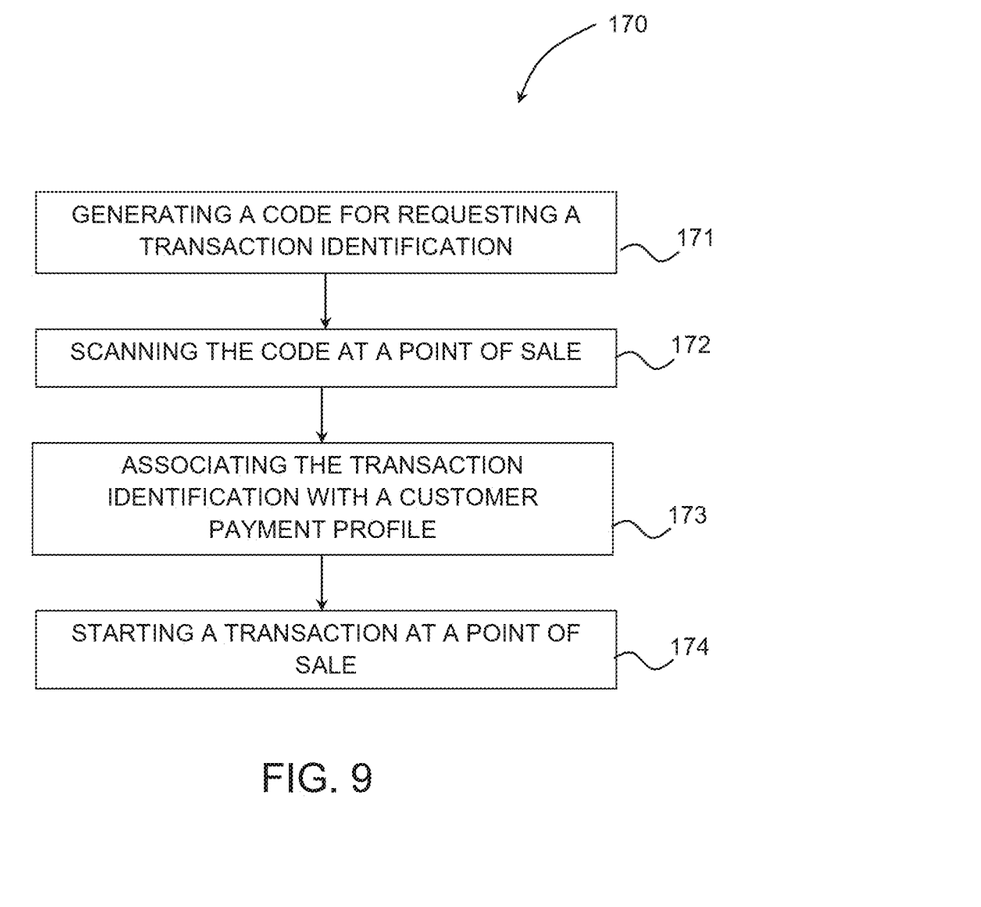
FIG. 9 is a flow diagram illustrating another method for checking in at a checkout point of sale, in accordance with embodiments.

FIG. 9 depicts a method 170 for checking in at a point of sale in accordance with embodiments. The method 170 includes generating a code for requesting a transaction identification (Step 171); scanning the code at a point of sale (Step 172); associating the transaction identification with a customer payment profile in response to scanning of the code (Step 173); and starting a transaction at a point of sale, wherein payment is effected at the end of the transaction at the point of sale (Step 174). According to embodiments, starting a transaction at the point of sale may occur prior to scanning of the code.

Step 171 of generating the code comprises generating a QR code or generating a one-dimensional code. Step 172 of scanning the code includes scanning the code with an input device of the point of sale.

The method 170 may further comprising sending a check-in event the backend systems to the point of sale for associating the transaction identification with the customer payment profile, wherein the check-in event automatically triggers operation of software instruction on the backend system to associate the transaction identification with the customer payment profile.

Figure 10:
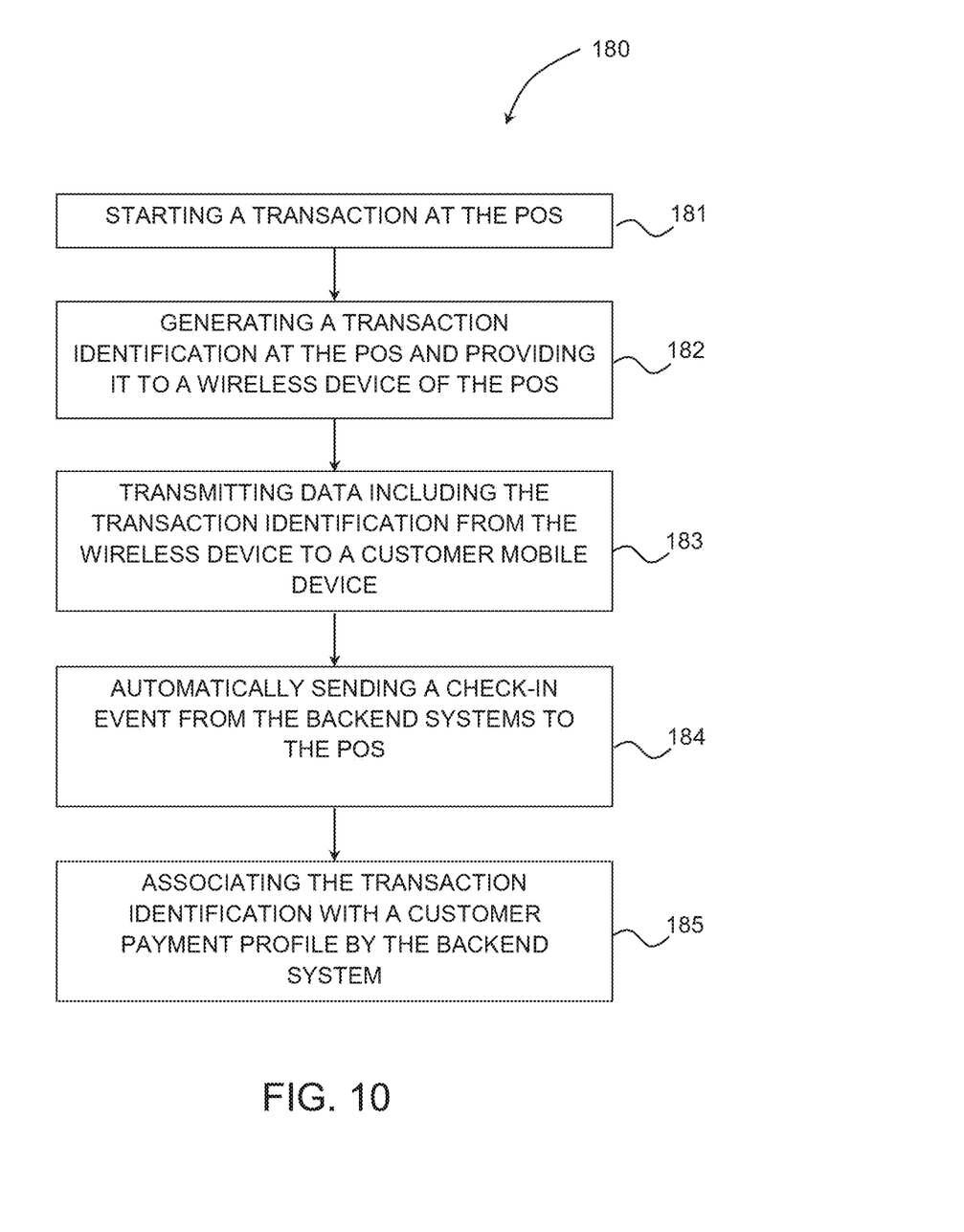
FIG. 10 is a flow diagram illustrating yet another method for checking in at a checkout point of sale, in accordance with embodiments.

FIG. 10 depicts a method 180 for checking in at a point of sale in accordance with embodiments. The method 180 includes starting a transaction at the point of sale (Step 181); generating a transaction identification at the point of sale and providing it to a wireless device of the point of sale (Step 182); transmitting data including the transaction identification from the wireless device to a customer mobile device (Step 183); automatically sending a check-in event from the backend systems to the point of sale in response to receiving the transaction identification from the wireless device (Step 184); and associating the transaction identification with a customer payment profile by the backend system, wherein payment is effected at the end of the transaction at the point of sale (Step 185).

Step 183 of transmitting data from the wireless device to the customer mobile device may include transmitting data with a Bluetooth/Bluetooth low energy communication, a near field communication, or a radio frequency communication. The data transmitted from the wireless device to the customer mobile device further comprises a store identification and a register identification.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), solid-state drives (SSD), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a wireless network, a cellular data network, a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for checking in at a point of sale, comprising:
starting a transaction at the point of sale in a brick-and-mortar store owned by a business in response to scanning an item for purchase;
generating a scannable code in response to starting the transaction at the point of sale, wherein the scannable code includes a transaction identification and displaying the scannable code on a card processing device coupled to the point of sale;
navigating to a check-in feature of a mobile application on a customer mobile device and providing an authentication credential prior to scanning the code;
scanning the code displayed on the customer facing display at the point of sale with the customer mobile device operating the mobile application prior to completion of scanning all goods, wherein scanning the scannable code reports to a backend system that the mobile application has captured the transaction identification in response to scanning the scannable code and the backend system determines the specific point of sale device associated with the transaction identification;
sending a check-in event from the backend system to the point of sale and the point of sale acknowledging receipt of the check-in event wherein the check-in event automatically triggers operation of software instruction on the backend system to associate the transaction identification with a customer payment profile of a customer created e-commerce account for said business; and
sending a notification to the mobile application that the check-in was successful and establishing a link between the backend system, the customer mobile device and the point of sale in response to checking-in, wherein information is transmitted between the backend system, the mobile device and the point of sale, the information comprising payment data, authorizations, customer identifications, basket data, and electronic receipts;
effecting payment at the end of the transaction at the point of sale using at least one payment instrument stored in the customer created e-commerce account for said business, wherein the at least one payment instrument effects payment for online purchase of goods from said business and for purchase of goods from the brick-and-mortar store owned by said business.

2. The method of claim 1, wherein generating the code comprises generating a QR code.

3. The method of claim 1, wherein generating the code comprises generating a one-dimensional code.

4. The method of claim 1, wherein the code further comprises a store identification and a register identification.

5. A method for checking in at a point of sale, comprising:
generating a code for requesting a transaction identification and displaying the code on a card processing device coupled to a point of sale in a brick-and-mortar store owned by a business;
navigating to a check-in feature of a mobile application on a customer mobile device and providing an authentication credential prior to scanning the code;
scanning the code at the point of sale displayed on the display with the mobile computing device operating the mobile application providing access to a system employing the method prior to completion of scanning all goods, wherein scanning the code reports to a backend system that the mobile application has captured the transaction identification in response to scanning the scannable code and the backend system determines the specific point of sale device associated with the transaction identification;
sending a check-in event from the backend system to the point of sale and the point of sale acknowledging receipt of the check-in event wherein the check-in event automatically triggers operation of software instruction on the backend system to associate the transaction identification with a customer payment profile of a customer created e-commerce account for said business; and
sending a notification to the mobile application that the check-in was successful and establishing a link between the backend system, the customer mobile device and the point of sale, wherein information is transmitted through the link between the backend system, the mobile device and the point of sale, the information comprising payment data, authorizations, customer identifications, basket data, and electronic receipts; and starting a transaction at the point of sale in the brick-and-mortar store owned by said business,
effecting payment at the end of the transaction at the point of sale using at least one payment instrument stored in the customer created e-commerce account for said business, wherein the at least one payment instrument effects payment for online purchase of goods from said business and for purchase of goods from the brick-and-mortar store owned by said business.

6. The method of claim 5, wherein generating the code comprises generating a QR code.

7. The method of claim 5, wherein generating the code comprises generating a one-dimensional code.

8. The method of claim 5, wherein scanning the code comprises scanning the code with an input device of the point of sale.

9. A method for checking in at a point of sale, comprising:
starting a transaction at the point of sale in a brick-and-mortar store owned by a business in response to scanning an item for purchase;
generating a transaction identification at the point of sale and transmitting it to a wireless device;
transmitting data including the transaction identification from the wireless device to a customer mobile computing device, wherein the mobile computing device is operating a mobile application and receives the transmission of the wireless device when the mobile computing device is within range of the transmission of the wireless device;
launching a check-in feature of the mobile application operated on the mobile computing device and providing an authentication credential prior to scanning the code to report to a backend system that the mobile application has captured the transaction identification in response to transmission of the wireless device prior to completion of scanning all goods;
gathering additional information by the backend system to determine the specific point of sale device associated with the transaction identification establish a link between the backend system, the customer mobile device and the point of sale, wherein information is transmitted through the link between the backend systems, the mobile device and the point of sale, the information comprising payment data, authorizations, customer identifications, basket data, and electronic receipts; and associating the transaction identification with a customer payment profile of a customer created e-commerce account for said business, effecting payment at the end of the transaction at the point of sale using at least one payment instrument stored in the customer created e-commerce account for said business, wherein the at least one payment instrument effects payment for online purchase of goods from said business and for purchase of goods from the brick-and-mortar store owned by said business.

10. The method of claim 9, wherein transmitting data from the wireless device to the customer mobile device comprises transmitting data with a Bluetooth/Bluetooth low energy communication.

11. The method of claim 9, wherein transmitting data from the wireless device to the customer mobile device comprises transmitting data with a near field communication.

12. The method of claim 9, wherein transmitting data from the wireless device to the customer mobile device comprises transmitting data with a radio frequency communication.

13. The method of claim 9, wherein the data transmitted from the wireless device to the customer mobile device further comprises a store identification and a register identification.

14. A check-in system at a point of sale, the system comprising:

a point of sale in a brick-and-mortar store owned by a business, wherein a transaction identification is generated at the point of sale; and a backend system configured to:

receive the transaction identification by the backend system from a customer mobile device in response to scanning a code containing the transaction identification by the customer mobile device operating a check-in feature of a mobile application and providing an authentication credential prior to scanning the code, wherein the code is generated and at the point of sale and displayed on a card processing device associated with the point of sale, and wherein the mobile application reports to the backend system that the mobile application has captured the transaction identification in response to scanning the scannable code, prior to completion of scanning all goods;

gather customer information for associating the transaction identification with a customer payment profile of a customer created e-commerce account for said business in response to receiving transaction identification and the report from the mobile application that captured the transaction identification;

establish a link between the backend system, the customer mobile device and the point of sale, wherein information is transmitted through the link between the backend system, the mobile device and the point of sale, the information comprising payment data, authorizations, customer identifications, basket data, and electronic receipts; and effect payment at the end of the transaction at the point of sale using at least one payment instrument stored in customer created e-commerce account for said business, wherein the point of sale is in communication with the backend system, wherein the at least one payment instrument effects payment for online purchase of goods from said business and for purchase of goods from the brick-and-mortar store owned by said business.

15. The system of claim 14, wherein the code is a QR code.

16. The system of claim 14, wherein backend system sends notifications to the customer mobile device when the transaction is completed.

* * * * *

UNITED STATES PATENT AND TRADEMARK OFFICE
CERTIFICATE OF CORRECTION

| | |
|---|---|
| PATENT NO. | : 10,810,577 B2 |
| APPLICATION NO. | : 15/308473 |
| DATED | : October 20, 2020 |
| INVENTOR(S) | : Bradley Joseph Kieffer et al. |

It is certified that error appears in the above-identified patent and that said Letters Patent is hereby corrected as shown below:

Claim 14, Column 12, Line 23, insert --the-- after "stored in".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*